US012805646B2

(12) United States Patent
Watts et al.

(10) Patent No.: US 12,805,646 B2
(45) **Date of Patent: *Nov. 24, 2026**

(54) INFLATABLE VEHICLE ACCESSORIES

(71) Applicant: FLATED LLC, Vista, CA (US)

(72) Inventors: Daniel Watts, Carlsbad, CA (US); Kenneth Tenhoeve, Gypsum, CO (US); Ryan Guay, Boulder, CO (US)

(73) Assignee: FLATED LLC, Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/682,097

(22) Filed: May 19, 2026

(65) Prior Publication Data

US 2026/0274052 A1 Sep. 17, 2026

Related U.S. Application Data

(63) Continuation of application No. 18/781,850, filed on Jul. 23, 2024, which is a continuation of application
(Continued)

(51) Int. Cl.
*E04H 15/06* (2006.01)
*A47C 17/80* (2006.01)
(Continued)

(52) U.S. Cl.
CPC ............. *B60J 7/1256* (2013.01); *A47C 17/80* (2013.01); *A47C 27/08* (2013.01); *A47C 27/081* (2013.01); *A47C 27/10* (2013.01); *B60J 7/141* (2013.01); *B60J 7/1607* (2013.01); *B60P 3/32* (2013.01); *B60P 3/341* (2013.01); *B60P 3/38* (2013.01); *E04B 1/169* (2013.01); *E04H 15/06* (2013.01);
(Continued)

(58) Field of Classification Search
CPC ........ B60J 7/1256; E04B 1/169; E04H 15/20; E04H 2015/202; E04H 2015/205
USPC .......... 135/88.13, 88.15; 52/2.11, 2.17, 2.22, 52/2.25
See application file for complete search history.

(56) References Cited

U.S. PATENT DOCUMENTS 4,093,302 A * 6/1978 Adams ...................... B60P 3/34 296/100.18
4,272,119 A 6/1981 Adams
(Continued)

FOREIGN PATENT DOCUMENTS

CA 2616566 A1 6/2008
DE 202018104197 U1 7/2018
(Continued)

OTHER PUBLICATIONS

Watts, Daniel; Non-Final Office Action for U.S. Appl. No. 18/605,668, filed Mar. 14, 2024, mailed May 29, 2024, 15 pgs.
(Continued)

*Primary Examiner* — Robert Canfield
(74) *Attorney, Agent, or Firm* — Smith, Gambrell & Russell, LLP

(57) ABSTRACT

A truck shell device for use with a vehicle includes a plurality of walls, the truck shell device configured to connect to the vehicle, the truck shell device including at least one of the plurality of walls at least partially formed of a drop-stitch material, the plurality of walls defining a space, and at least one of the plurality of walls being inflatable.

22 Claims, 6 Drawing Sheets

Related U.S. Application Data

No. 18/605,668, filed on Mar. 14, 2024, now Pat. No. 12,077,977, which is a continuation of application No. 17/481,901, filed on Sep. 22, 2021, now Pat. No. 11,976,487.

(60) Provisional application No. 63/137,080, filed on Jan. 13, 2021, provisional application No. 63/081,526, filed on Sep. 22, 2020.

(51) Int. Cl.

| | |
|---|---|
| ***A47C 27/08*** | (2006.01) |
| ***A47C 27/10*** | (2006.01) |
| ***B60J 7/10*** | (2006.01) |
| ***B60J 7/12*** | (2006.01) |
| ***B60J 7/14*** | (2006.01) |
| ***B60J 7/16*** | (2006.01) |
| ***B60P 3/32*** | (2006.01) |
| ***B60P 3/34*** | (2006.01) |
| ***B60P 3/38*** | (2006.01) |
| ***E04B 1/16*** | (2006.01) |
| ***E04H 15/20*** | (2006.01) |

(52) U.S. Cl.

CPC ....... *E04H 15/20* (2013.01); *E04H 2015/202* (2013.01); *E04H 2015/205* (2013.01); *E04H 2015/206* (2013.01)

(56) References Cited

U.S. PATENT DOCUMENTS

| | | | | | |
|---|---|---|---|---|---|
| 4,296,960 | A | | 10/1981 | Winchester | |
| 4,486,479 | A | * | 12/1984 | F'Geppert | E04H 15/20 52/2.21 |
| 4,531,775 | A | | 7/1985 | Beals | |
| 5,335,960 | A | | 8/1994 | Benignu, Jr. | |
| 5,630,296 | A | * | 5/1997 | Kendall, Jr. | A62B 17/00 135/97 |
| 5,636,478 | A | * | 6/1997 | Chen | E04H 15/324 135/96 |
| 5,692,795 | A | * | 12/1997 | Mininger | E04H 15/20 296/159 |
| 6,626,125 | B1 | | 9/2003 | Klimenko | |
| 8,065,761 | B2 | | 11/2011 | Hanrahan | |
| 8,860,159 | B2 | | 10/2014 | Meitzler et al. | |
| 9,003,562 | B2 | | 4/2015 | Clauson et al. | |
| 9,624,688 | B1 | | 4/2017 | Tyson | |
| 10,569,714 | B2 | | 2/2020 | Amoriello | |
| 10,647,286 | B1 | | 5/2020 | Dennis et al. | |
| 10,745,932 | B1 | | 8/2020 | Currid | |
| 11,059,414 | B2 | | 7/2021 | Dorn | |
| D935,378 | S | * | 11/2021 | Chen | D3/276 |
| 11,352,808 | B2 | | 6/2022 | Chen et al. | |
| 11,426,620 | B2 | | 8/2022 | Park et al. | |
| 11,446,993 | B2 | | 9/2022 | Singer | |
| D1,000,349 | S | * | 10/2023 | You | D15/199 |
| 11,805,751 | B1 | | 11/2023 | Hoge et al. | |
| 11,976,487 | B2 | | 5/2024 | Watts et al. | |
| 12,030,423 | B2 | | 7/2024 | Dorn et al. | |
| 12,077,977 | B2 | | 9/2024 | Watts et al. | |
| 12,091,874 | B2 | | 9/2024 | Payne et al. | |
| 12,330,486 | B2 | * | 6/2025 | Flemming | B60P 3/34 |
| 12,408,729 | B2 | * | 9/2025 | Kodad | A43B 13/20 |
| 12,595,675 | B2 | * | 4/2026 | Wiegel | B60P 3/341 |
| 12,629,998 | B2 | * | 5/2026 | Shi | B60J 7/104 |
| 2002/0163221 | A1 | | 11/2002 | Smith | |
| 2003/0205913 | A1 | | 11/2003 | Leonard | |
| 2006/0239791 | A1 | | 10/2006 | Morris | |
| 2008/0210282 | A1 | | 9/2008 | Turcot | |
| 2012/0131857 | A1 | * | 5/2012 | Ross-da Silva | E04H 15/20 52/2.18 |
| 2013/0119681 | A1 | | 5/2013 | Mendis et al. | |
| 2015/0026878 | A1 | * | 1/2015 | Rambo | E04H 4/103 4/499 |
| 2016/0286982 | A1 | * | 10/2016 | Smith | A47D 9/016 |
| 2017/0081867 | A1 | | 3/2017 | Wasson | |
| 2017/0119116 | A1 | | 5/2017 | Bradley | |
| 2019/0335703 | A1 | | 11/2019 | Prade et al. | |
| 2020/0307118 | A1 | | 10/2020 | Hjerpe et al. | |
| 2020/0307154 | A1 | | 10/2020 | Hjerpe et al. | |
| 2021/0024276 | A1 | | 1/2021 | Bradley | |
| 2022/0090407 | A1 | | 3/2022 | Watts et al. | |
| 2022/0212858 | A1 | * | 7/2022 | Krajewski | A45C 11/20 |
| 2022/0268050 | A1 | * | 8/2022 | Yakubov | E04H 15/324 |
| 2023/0211563 | A1 | * | 7/2023 | Enserink | B29C 66/7292 156/308.4 |
| 2023/0323700 | A1 | * | 10/2023 | Thelin | E04H 15/06 52/2.11 |
| 2024/0218693 | A1 | | 7/2024 | Watts et al. | |
| 2024/0376740 | A1 | | 11/2024 | Watts et al. | |
| 2025/0135851 | A1 | | 5/2025 | Shi et al. | |
| 2025/0376868 | A1 | * | 12/2025 | Wiegel | B60P 3/341 |
| 2026/0201725 | A1 | * | 7/2026 | King | E04H 15/20 |
| 2026/0226764 | A1 | * | 8/2026 | Wiegel | E04H 15/06 |

FOREIGN PATENT DOCUMENTS

| | | | |
|---|---|---|---|
| EP | 3403877 | A1 | 11/2018 |
| EP | 3501892 | A1 | 6/2019 |
| KR | 20190059559 | A | 5/2019 |
| KR | 102014995 | B1 | 10/2019 |
| WO | 2017/201555 | A1 | 11/2017 |

OTHER PUBLICATIONS

Watts, Daniel; Notice Of Allowance for U.S. Appl. No. 18/605,668, filed Mar. 14, 2024, mailed Jul. 16, 2024, 8 ogs.

Watts, Daniel; Non-Final Office Action for U.S. Appl. No. 17/481,901, filed Sep. 22, 2021, mailed Sep. 14, 2023, 17 pgs.

Watts, Daniel; Final Office Action for U.S. Appl. No. 17/481,901, filed Sep. 22, 2021, mailed Dec. 22, 2023, 13 pgs.

Watts, Daniel; Notice of Allowance for U.S. Appl. No. 17/481,901, filed Sep. 22, 2021, mailed Mar. 20, 2024, 12 pgs.

Watts, Daniel; Non-Final Office Action for U.S. Appl. No. 18/781,850, filed Jul. 23, 2024, mailed Apr. 3, 2026, 20 pgs.

Watts, Daniel; Notice of Allowance for U.S. Appl. No. 18/781,850, filed Jul. 23, 2024, mailed Jul. 21, 2026, 8 pgs.

* cited by examiner

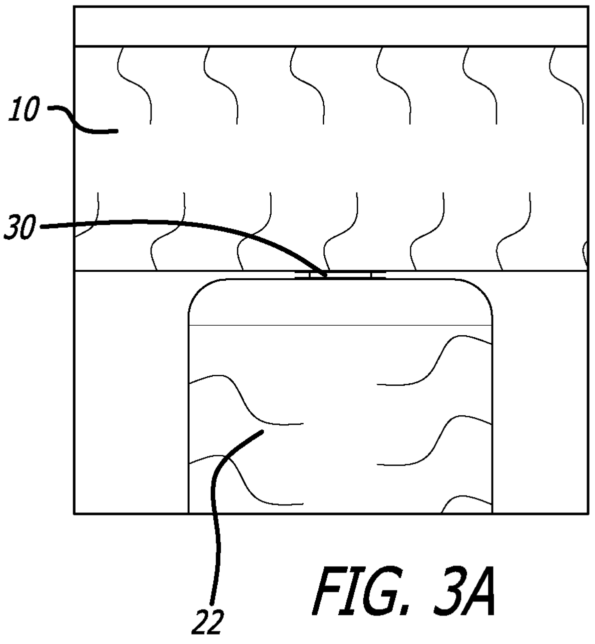
FIG. 3A
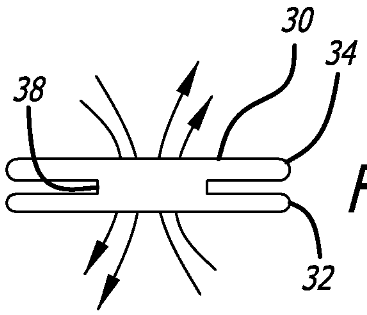
FIG. 3B
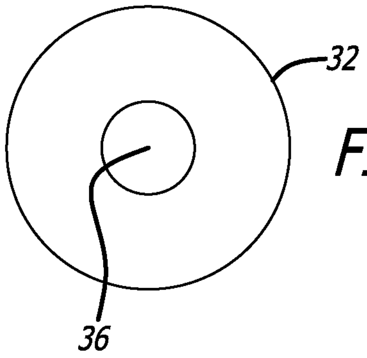
FIG. 3C
FIG. 4
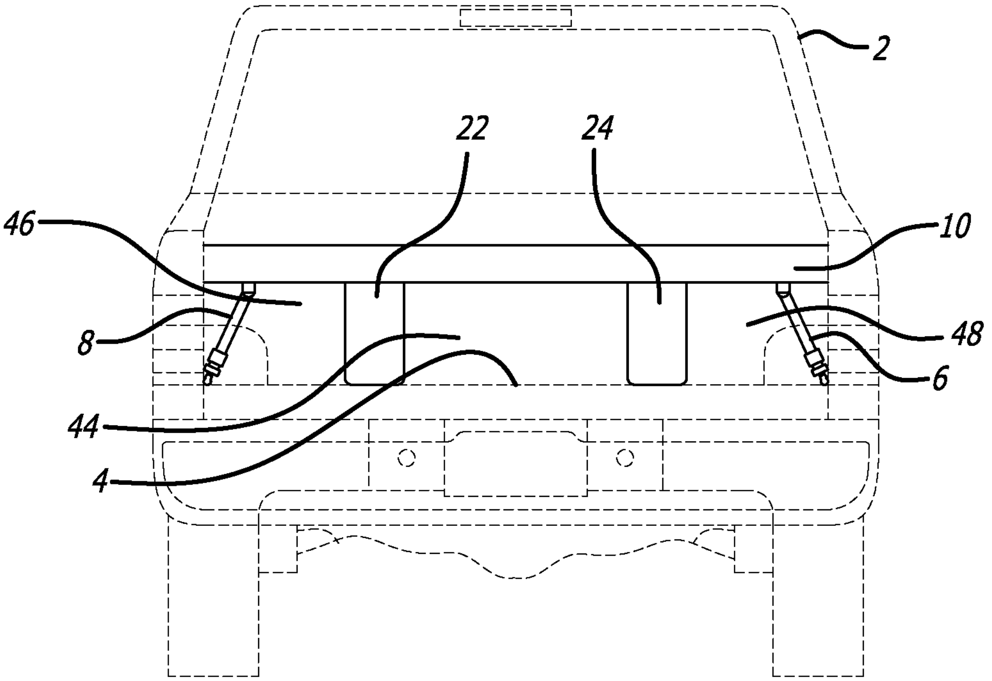

INFLATABLE VEHICLE ACCESSORIES

REFERENCE TO RELATED APPLICATIONS

This application is a continuation of U.S. patent application Ser. No. 18/781,850, filed Jul. 23, 2024, which is a continuation of U.S. patent application Ser. No. 18/605,668, filed Mar. 14, 2024, which issued into U.S. Pat. No. 12,077,977, which is a continuation of U.S. patent application Ser. No. 17/481,901, filed Sep. 22, 2021, which issued into U.S. Pat. No. 11,976,487, which claims priority to U.S. Provisional Application No. 63/081,526, filed Sep. 22, 2020, and U.S. Provisional Application No. 63/137,080, filed Jan. 13, 2021, all of which are incorporated herein by reference in their entireties.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records but otherwise reserves all copyright and trade dress rights whatsoever.

BACKGROUND

Field: Vehicle accessories

General Background and State of the Art: One class of vehicle accessories are those that attach to the outside of a vehicle, usually to the roof or a truck bed. One type, a vehicle cargo carrier, attaches to vehicles to allow people to carry luggage, skis, camping gear and other items. Some use them for travel to airports, train stations or cruise terminals when their vehicle trunk is not large enough to carry all needed luggage. Large carriers can hold over 20 $ft^3$ (≈0.57 $m^3$) (metric equivalents are approximated). Others may need one for camping trips to carry a tent and other camping gear.

Storage of a carrier can be an issue when the carrier is off the vehicle and not in use. Most are made of rigid plastic, fiberglass or metal, which retain their shapes when not in use and occupy space in the user's garage, shed or elsewhere.

Mounting a cargo carrier to the vehicle is another issue. Some vehicles especially SUVs have roof racks to support and secure loads. But many vehicles have no roof rack. Attaching a carrier to a roof without a rack is risky and potentially dangerous. Some people may try holding a carrier to the roof with ropes passing through the vehicle windows, but the load shifts easily, which can scratch the roof or even allow the carrier to fly off the roof especially at high speed.

Truck shells, which are also called truck caps and truck toppers, are another vehicle attachment. They commonly are rigid and rest on a truck bed. The portion above the bed may include flaps of canvas or similar materials to cover openings acting as windows to allow air into the truck shell. At least one opening may be large enough for a user to enter and exit the housing. The flaps may be closed or fully or partially opened with a zipper, Velcro®, magnets, or another fastener. The housing must be large enough to hold persons comfortably, but their large size also can create mounting and storage issues.

Though pickup truck beds can be wide, they are hard and some find sleeping difficult. Sleeping comfortably may be difficult if the bed is too narrow to accommodate all persons. By setting aside space for sleepers on the truck bed, items normally kept on the truck bed must be kept elsewhere.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a truck shell device for use with a truck having a truck bed, the truck shell device comprising: a front wall; a first sidewall attached to the front wall; a second sidewall attached to the front wall; a shell top extending between the first sidewall, the second sidewall, and the front wall; a first space collectively defined between the front wall, the first sidewall, the second sidewall, and the shell top; wherein the truck shell device is configured to connect to the truck proximate the truck bed; wherein the front wall, the first sidewall, and the second sidewall are each at least partially formed of a drop-stitch material; wherein the first space defines an open bottom for exposing the first space to the truck bed; and wherein at least one of the front wall, the first sidewall, the second sidewall, and the shell top is inflatable.

In another aspect, disclosed is a device for use with a vehicle, the device comprising: a first wall defining a first end of the first wall and a second end of the first wall; a second wall positioned opposite the first wall, the second wall defining a first end of the second wall and a second end of the first wall; a third wall coupled to the first wall and the second wall, the third wall positioned between the first wall and the second wall proximate the second end of the first wall and the second end of the second wall; and a fourth wall coupled to the first wall, the second wall, and the third wall; wherein the first wall, the second wall, the third wall, and the fourth wall collectively define a cavity; wherein the first wall, the second wall, the third wall, and the fourth wall are each at least partially formed of an inflatable drop-stitch material; and wherein the device is configured to couple to the vehicle.

In another aspect, disclosed is a device for use with a truck comprising a truck bed and a plurality of sides extending from the truck bed, the device comprising: a front wall; a first sidewall connected to the front wall; a second sidewall connected to the front wall, the second sidewall positioned opposite the first sidewall; a shell top extending between and connected to the first sidewall, the second sidewall, and the front wall; wherein at least one edge of the first sidewall, the second sidewall, and the front wall is configured to align with at least one of the plurality of the sides of the truck; wherein the front wall, the first sidewall, the second sidewall, and the shell top are each at least partially formed of a drop-stitch material; wherein at least one of the front wall, the first sidewall, the second sidewall, and the shell top is inflatable; and wherein the device is configured to couple to the truck.

In another aspect, disclosed is a truck shell device for use with a truck having a truck bed, the truck shell device comprising: a front wall; a first sidewall attached to the front wall; a second sidewall attached to the front wall; a shell top extending between the first sidewall, the second sidewall, and the front wall; a first space collectively defined between the front wall, the first sidewall, the second sidewall, and the shell top; wherein the truck shell device is connected to the truck proximate the truck bed; wherein the front wall, the first sidewall, and the second sidewall are each at least partially formed of a drop-stitch material; wherein the first space defines an open bottom for exposing the first space to the truck bed; and wherein at least one of the front wall, the first sidewall, the second sidewall, and the shell top is inflatable.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures may be designated by matching reference characters for the sake of consistency and clarity.

FIG. 3A is a sectional view of the top of applicant's support; FIG. 3B is a sectional view of the connection between the top and one leg of applicant's support within the circled area of FIG. 3B; and FIG. 3C is a top view of that connection.

FIG. 4 is a rear view of a truck in which applicant's support is mounted.

DETAILED DESCRIPTION

Figure 1:
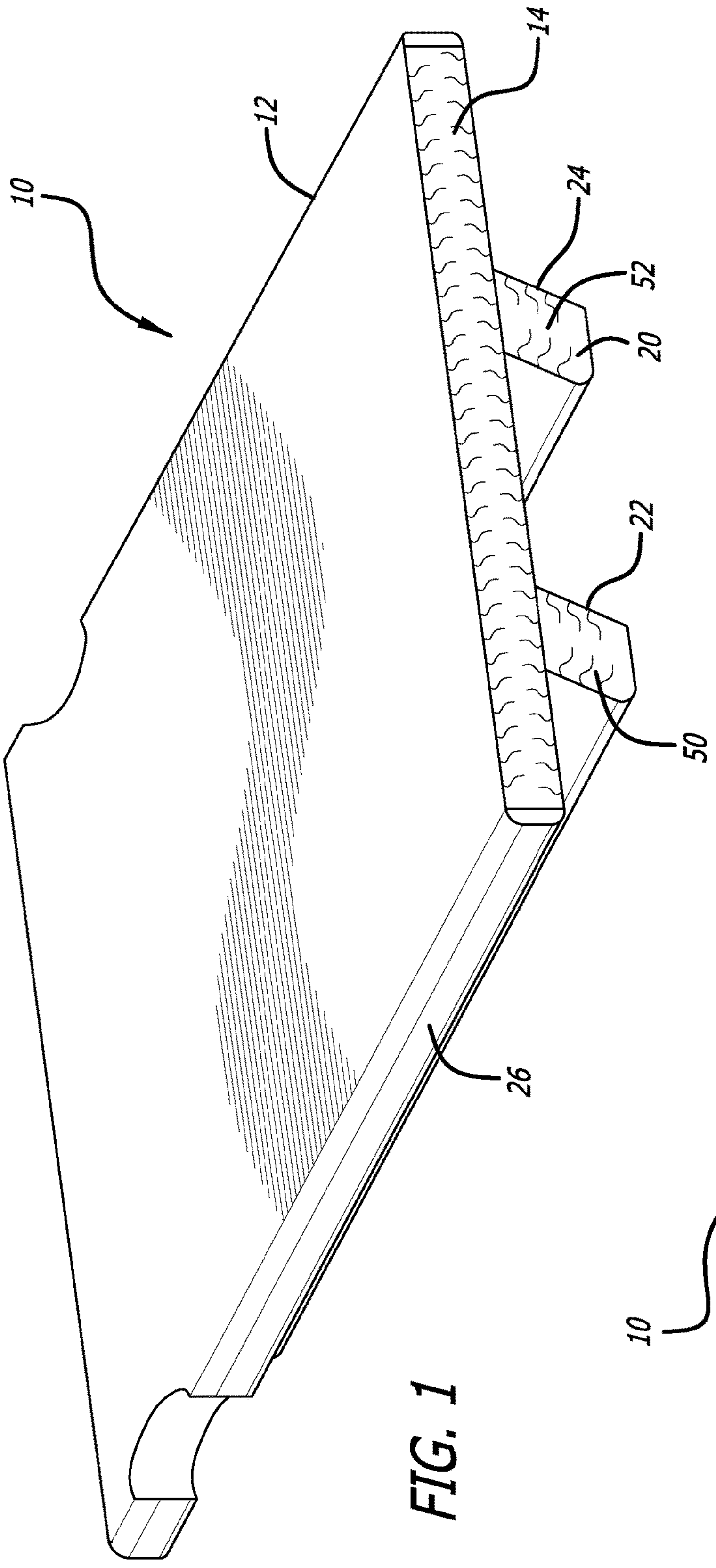
FIG. 1 is a perspective view of applicant's support.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description can be monolithic whether or not such an explicit description of the structure is included herein.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a truck shell device nearest to a seat of a truck; and "rear" is that end of the truck shell device that is opposite or distal the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a truck shell device and associated methods, systems, devices, and various apparatuses are disclosed herein.

The raised platform design: This design forms a platform made of drop-stitch material. The material joins two pieces of polyester woven support fabric with thousands of fine, flexible polyester threads 20 attaching the two pieces together into a strong unit.

An air-tight coating is applied to the outer surfaces of both sides of the material. The sidewalls of the panels are made of polyester base fabric coated on both sides. Polyester thread is used throughout because it is strong, durable and has little stretch. The resulting panels can be inflated to pressures of 20 psi (≈138 kPa).

Platform 10 (FIGS. 1 and 2) has length sides 12 and width sides 14 forming top 16 and bottom 18. The platform is flat due to its inflated, drop-stitch fabric. The top surface may have a surface coating to resist the sun, avoid sipping or falls or for other reasons.

Valves 30 (FIG. 3A-3C) connect platform 10 and legs 22 and 24. Each valve comprises a top and bottom flange 34 and 32 on ring 38. The ring has an opening through it. The valves attach to the bottom surface 18 of the platform and the top of the legs. When inflating platform 10 or a leg 22 or 24 through a valve (not shown), the valve allows the pressurized air to fill the platform and legs simultaneously. To deflate the platform, a user opens the valve, and the platform and legs deflate simultaneously.

Both figures also show legs 22 and 24 depending from the platform's bottom. The legs also are formed of drop-stitch material. PVC tape or tape another material seals the edges of the drop-stitch material so the platform and legs are airtight at high pressures.

The platform can mount on the bed 4 of a truck such as pickup truck 2 (FIG. 4). Tie-downs 6 secure the platform 10 to the truck bed 4, but the platform also can be removed from the truck and mounted on the ground or a building floor. Sidewalls 12 of platform 10 have indentations 40 and 42 to help grip the platform.

The platform in FIG. 4 extends to the truck's sidewalls 8, and the height of legs 22 and 24 position platform 10 at or near the top of the truck's sidewalls. Taller legs could mount the platform above the sidewall and the platform could be wider to extend beyond the sidewalls for a wider surface to accommodate more people or objects.

Elevating platform 10 provides a central storage space 44 and two side storage spaces 46 and 48 (FIG. 4) for objects such as camping equipment. Modifying the distance between legs 22 and 24 changes the sizes of the respective storage spaces.

Figure 2:
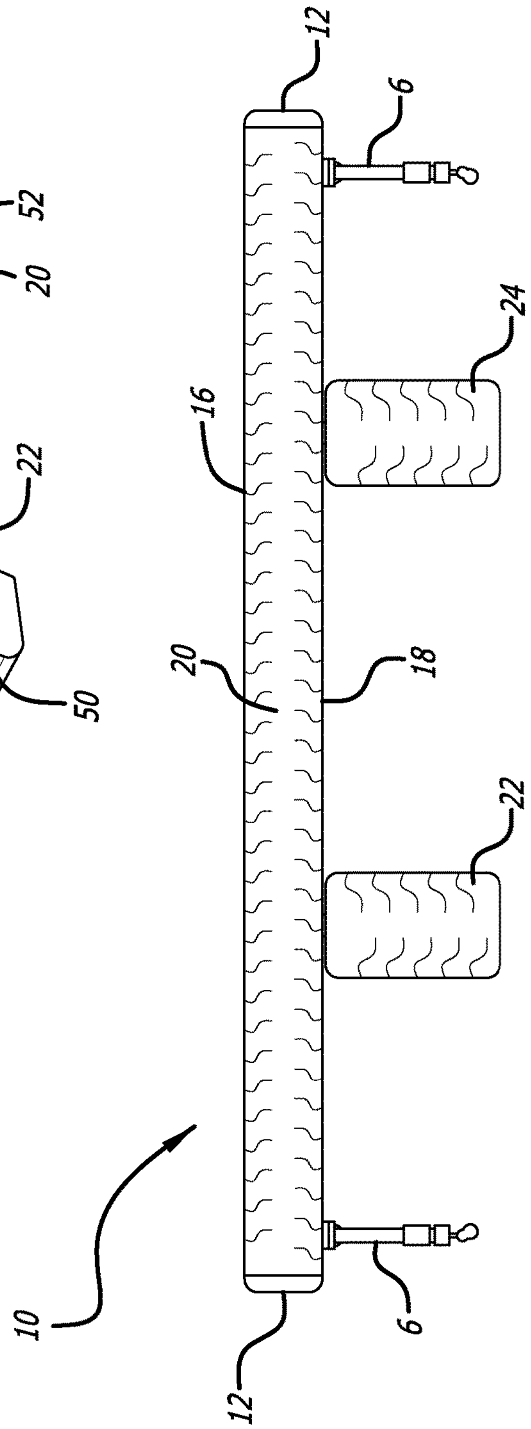
FIG. 2 is an end view of applicant's support.

Legs 22 and 24 extend most of the length of platform 10. They may have angled faces 50 and 52 (FIG. 1). The legs could be divided if desired.

Figure 5:
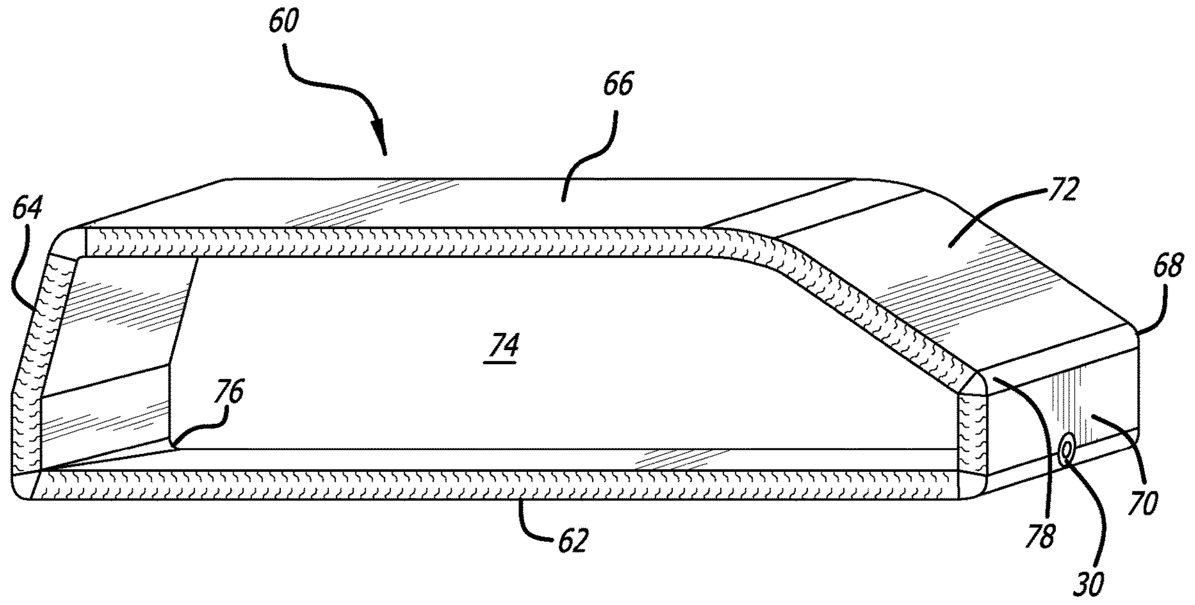
FIG. 5 is a side perspective of applicant's carrier.

The carrier design: Applicant also uses drop-stitch material for its carrier. Carrier 60 (FIGS. 5 and 6) comprises base 62, rear support 64, top 66 and a front section 68. The latter has a vertical section 70 and an angled section 72. FIG. 5 show the drop-stitch material inflated, which creates internal space 74.

Where the drop-stitch material changes direction such at the intersection of the base 72 and rear support 74, reinforcing tape 76 may be applied inside the carrier and at the outside 78 of the carrier. Valves like valves 30 in FIG. 3A-3C may be at the intersections of base 62, rear support 64, top 66 and front section 68. The cargo carrier also may be one piece of drop-stitch material that is bent to the angle shown in the drawings.

Figure 6:
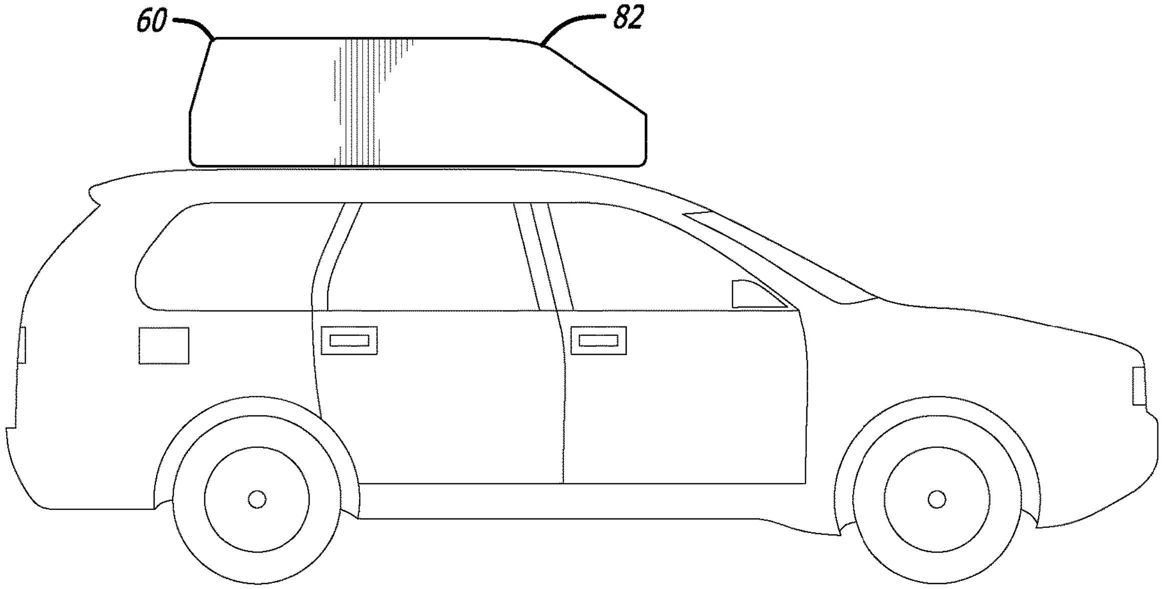
FIG. 6 is a side view showing applicant's carrier on a vehicle roof.
Figure 7:
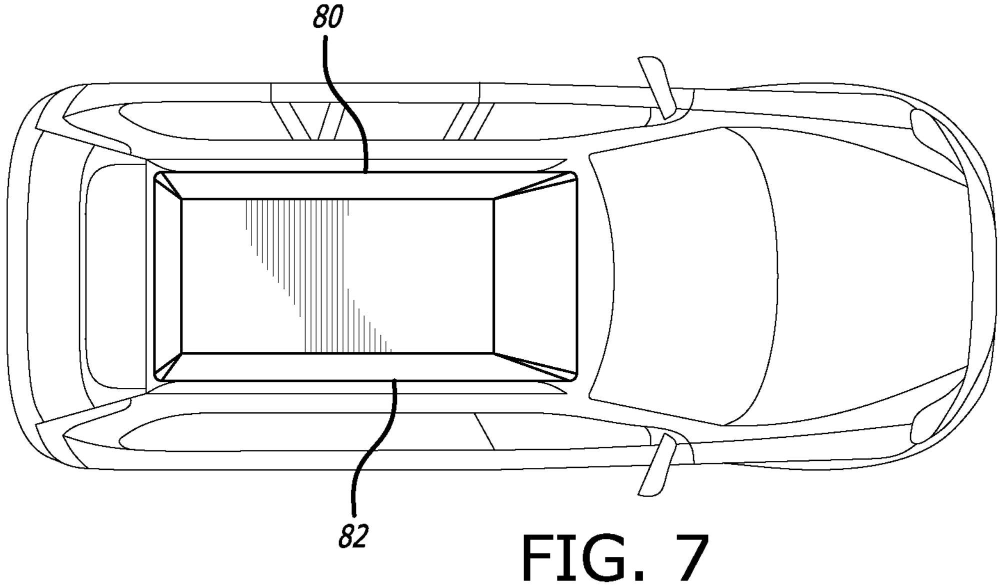
FIG. 7 is a plan view showing applicant's carrier on a vehicle roof.

Carrier 60 includes sides walls 80 and 82 (FIGS. 6 and 7). The walls may be made rigid by using inflatable drop-stitch material, or they may be made flexible by using materials such as canvas or plastic. FIG. 6 shows flexible side wall 82 partially attached to the carrier. A sidewall on the other side of the carrier is not shown in the drawing.

Fasteners such as clips, Velcro®, zippers, magnets or similar fasteners may connect to the sides of the carrier to side walls 80 and 82. Releasing fasteners allows access into the carrier for carrying luggage, camping equipment, surfboards, snowboards, skis, and other equipment.

The sidewalls 80 and 82 may have openings (not shown) to act as windows for ventilation. The "windows" may be transparent material to let outside light into the carrier. Depending on the carrier's length, persons may use it when empty to sleep. Any windows would allow ventilation for the sleeper.

Figure 8:
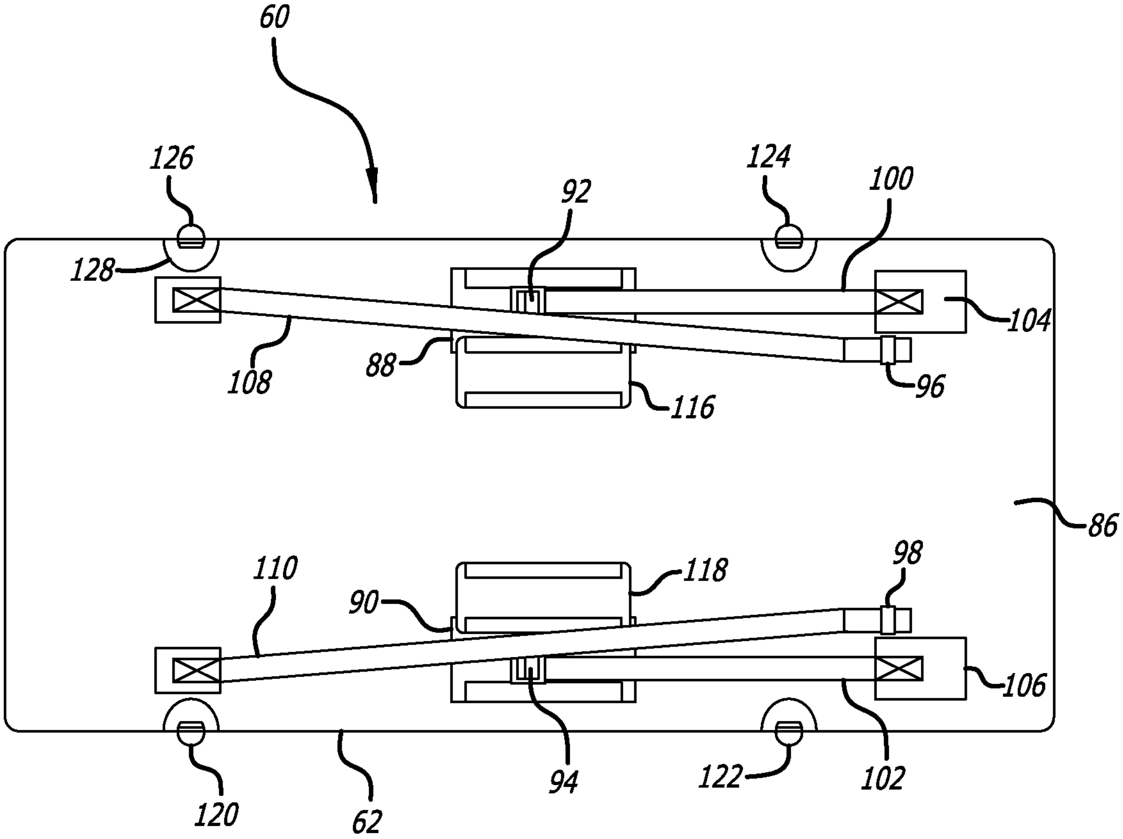
FIG. 8 is a bottom view of applicant's carrier.

Carrier 60 includes structure for attaching it to a vehicle roof. Bottom surface 86 of carrier base 62 includes housings 88 and 90 (FIG. 8). Each housing includes a strap clamp 92 and 94. Straps 100 and 102 extend from the respective strap clamp to a mounting bar that attaches to the vehicle roof at 104 and 106. Some vehicles have permanent mounting bars, but temporary bars are available to attach to a vehicle. A second set of straps 108 and 110 extend between the other mounting bars. Each strap 108 and 110 is tightened around the mounting bar on the right side of FIG. 8 where each can be tied off. Housings 88 and 90 have respective doors 116 and 118, which fold over the housing to protect clamps 92 and 94.

Clips such as D-rings 120, 122, 124 and 126 (FIG. 8) can mount on the outside of base 62. Short straps also may connect the D-rings to the vehicle. Adhesive pads such as pad 128 attach the D-rings to base 62.

The truck shell design: Applicant's device also may be constructed using drop-stitch material as a truck shell. Shell 140 (FIGS. 9, 10, 11 and 12) comprise front wall 142, two side walls 144 and 146 and an open rear 148. A door, which is flexible in FIG. 9 but may be rigid, covers the open rear. Fasteners attach door 152 to the rear of each sidewall.

Figure 10:
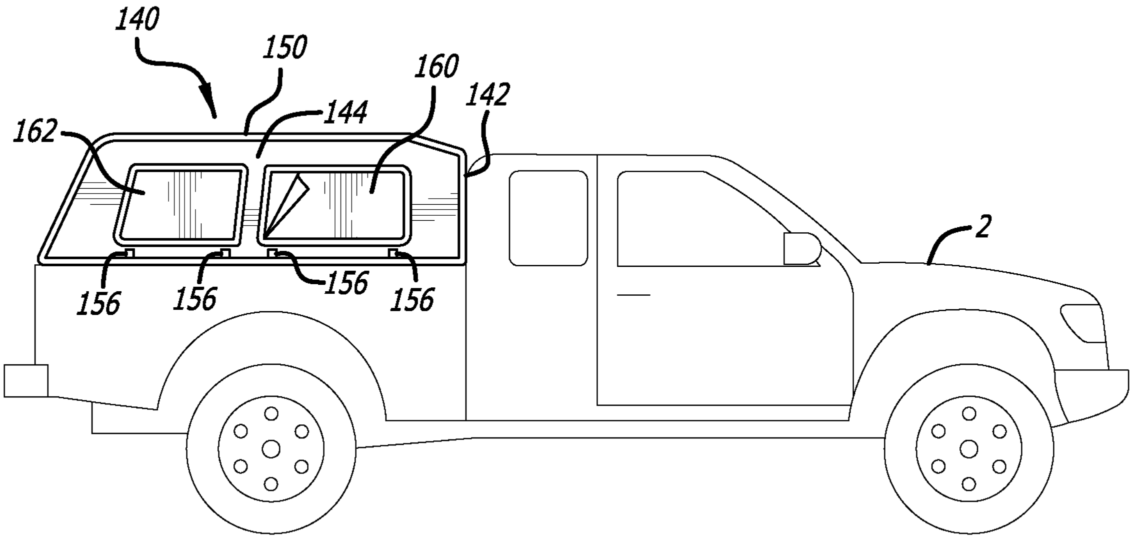
FIG. 10 is a side view of the truck shell mounted on a truck.

Clips 156 on straps 158 attach the shell to structure on truck 2 (FIG. 10). Top 150 of the truck shell attaches to the front wall 142 and sidewalls 144 and 146. The front wall may be curved (FIG. 11) to align with the truck's structure.

Figure 9:
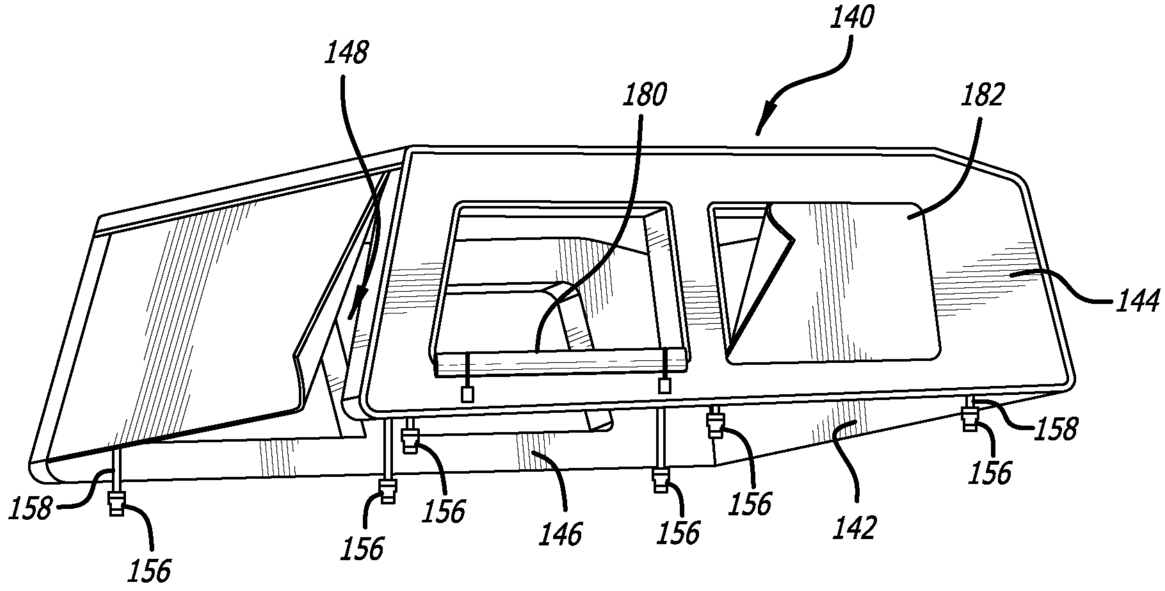
FIG. 9 is a perspective view of applicant's device used as a topper.
Figure 11:
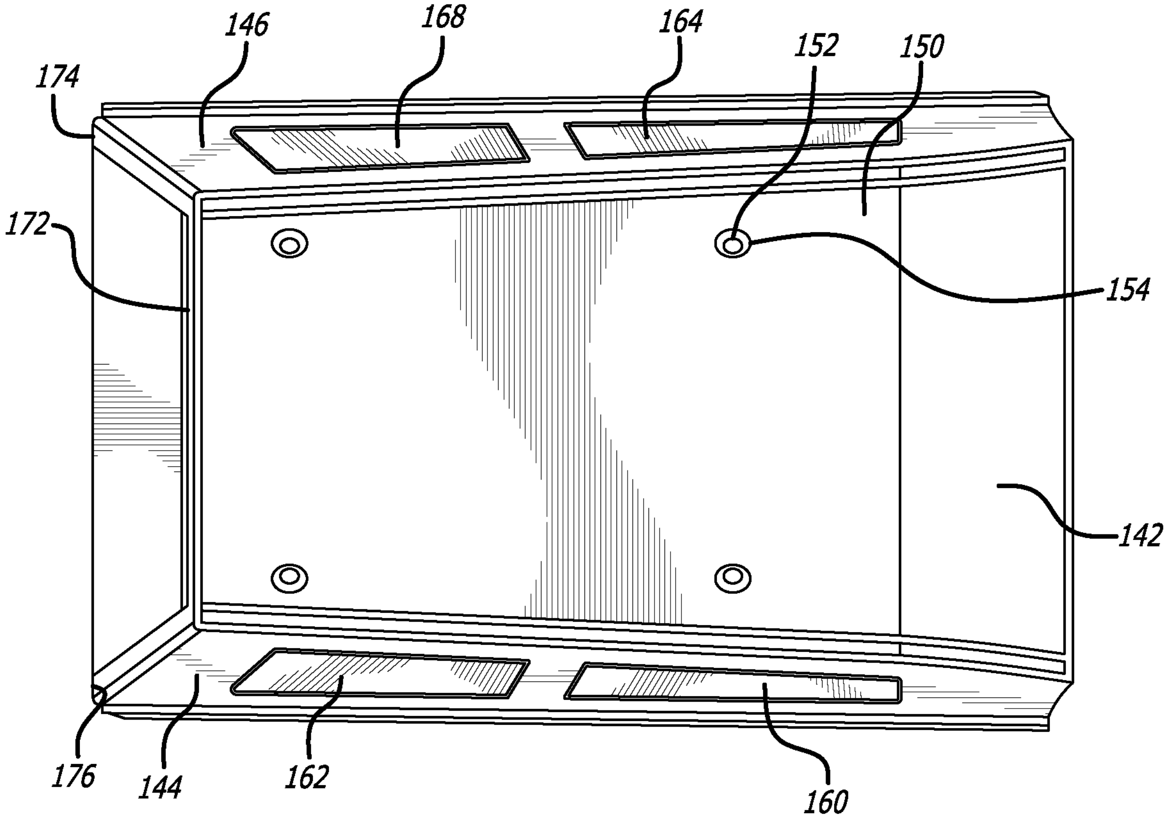
FIG. 11 is a plan view of the truck shell mounted.

Each sidewall 144 and 146 has window openings. FIGS. 9 and 11 show two on each side, 160, 162, 164 and 166. The windows may be covered with flexible material 180 and 182 (FIG. 9) of canvas, fabric or similar material. Material 180 is shown rolled up along the bottom of window 162. The top and side of the material can be secured to the top and sides of the window. Material 182 attaches to the perimeter of window 160 and a portion is shown unfastened. The inside of one or more windows can be transparent (not shown) so if material 180 or 182 is opened, outside light can illuminate the truck shell's inside while preventing rain or animals from entering the shell.

Figure 12:
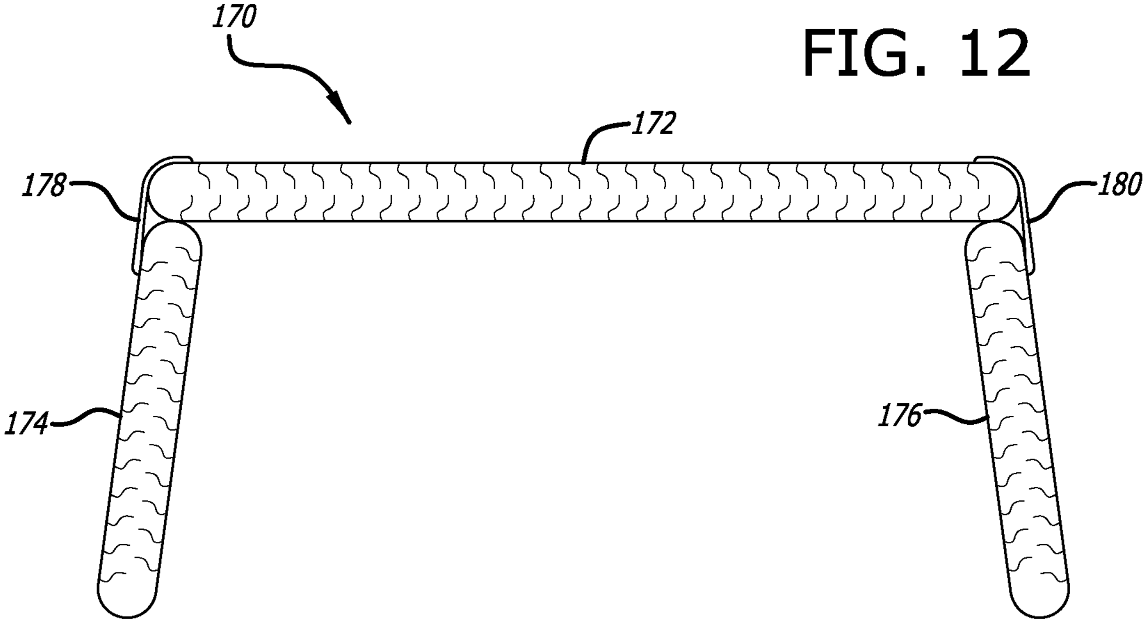
FIG. 12 is a rear end view of the truck shell.

Truck shell 140 may have no drop-stitch, rear wall; it is open to allow persons to enter or exit the shell. A rear wall of drop-stitch material with an opening through it is an option. For added support, a drop-stitch backing 170 may mount to the rear ends of top 150 and sidewalls 144 and 146 (FIGS. 11 and 12). FIG. 12 shows backing separately including it transverse section 172 and sides 174 and 176. Tape 178 and 180 may position the sides relative to the transverse section.

Material 178 and 180, which may be flexible or rigid covers the truck shell's rear opening 148 of truck shell 140 (FIGS. 9 and 12). Appropriate fasteners secure the material. When a person enters or exits the truck shell, the material is removed, opened to one side, or rolled up.

Top 150 of truck shell 140 may have rings such as ring 152 mounted on pad 154 (FIG. 11). The rings allow storage and conveyance on the shell's top of additional items such as camping gear and sporting equipment like surfboards. The truck shell normally is deflated during driving and should be small enough for the vehicle to carry.

The description is illustrative, not limiting and is for example only. Though this application shows and describes examples, those having ordinary skill in the art will find it apparent they can make changes, modifications or alterations. Many examples involve specific combinations of method acts or system elements, but those acts and those elements may be combined in other ways to achieve the same objectives. Acts, elements and features discussed only with one embodiment are not intended to be excluded from a similar role in other embodiments.

"Plurality" means two or more. A "set" of items may include one or more of such items. The terms "comprising," "including," "carrying," "having," "containing," "involving," and similar words in the written description or the claims are open-ended, i.e., each means, "including but not limited to." Only the transitional phrases "consisting of" and "consisting essentially of" are closed or semi-closed transitional phrases regarding claims. The ordinal terms like "first," "second," "third," etc., in the claims don't by themselves connote any priority, precedence, or order of one claim element over another or the temporal order in which acts of a method are performed. Instead, they merely are labels to distinguish one claim element having a certain name from another element having a same name (but for the ordinal term's use). Alternatives like "or" include one or any combination of the listed items.

One should note that conditional language, such as, among others, "can," "could," "might," or "may," unless expressly stated otherwise, or otherwise understood within the context as used, is generally intended to convey that certain aspects include, while other aspects do not include, certain features, elements, and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

The invention claimed is:

1. A truck shell device for use with a truck having a truck bed, the truck shell device comprising:
- a front wall;
- a first sidewall attached to the front wall;
- a second sidewall attached to the front wall;
- a shell top extending between the first sidewall, the second sidewall, and the front wall;
- a first space collectively defined between the front wall, the first sidewall, the second sidewall, and the shell top;
- wherein the truck shell device is configured to connect to the truck proximate the truck bed;
- wherein the front wall, the first sidewall, and the second sidewall are each at least partially formed of a drop-stitch material;
- wherein the first space defines an open bottom for exposing the first space to the truck bed; and
- wherein at least one of the front wall, the first sidewall, the second sidewall, and the shell top is inflatable.

2. The truck shell device of claim 1, wherein the truck shell device is configured to connect directly to the truck bed.

3. The truck shell device of claim 1, wherein at least one edge of the front wall, the first sidewall, and the second sidewall are configured to align with at least one of a plurality of walls of the truck.

4. The truck shell device of claim 1,
wherein the truck shell device is configured to be deflated so the truck shell device can be put into a container.

5. The truck shell device of claim 4,
wherein the front wall, the first sidewall, the second sidewall, and the shell top form a continuous structure when inflated.

6. The truck shell device of claim 1,
wherein the drop-stitch material comprises:
- an outer surface;
- an inner surface spaced away from the outer surface; and
- a space defined between the outer surface and the inner surface; and, wherein the outer surface and the inner surface are connected by thread.

7. The truck shell device of claim 1, wherein:
- the first sidewall comprises a rear end of the first sidewall;
- the second sidewall comprises a rear end of the second sidewall;
- the rear end of the first sidewall and the rear end of the second sidewall collectively define an open rear;
- the truck shell device further comprising a flap attached to the rear end of the first sidewall and the rear end of the second sidewall for covering the open rear; and
- wherein the flap is releasable from the open rear to provide access through the open rear.

8. The truck shell device of claim 7, wherein the truck shell device defines at least one opening through at least one of the first sidewall and the second sidewall to allow access into the first space.

9. The truck shell device of claim 7, wherein the releasable flap is configured to be rolled up.

10. The truck shell device of claim 1, wherein the truck shell device is configured to connect to the truck using a multi-component apparatus.

11. The truck shell device of claim 10, wherein the multi-component apparatus comprises clips and straps.

12. The truck shell device of claim 1, wherein the shell top is connected to at least one of the front wall, the first sidewall, and the second sidewall by tape.

13. The truck shell device of claim 12, wherein the tape is PVC tape.

14. A truck shell device for use with a truck having a truck bed, the truck shell device comprising:

a front wall;

a first sidewall attached to the front wall;

a second sidewall attached to the front wall;

a shell top extending between the first sidewall, the second sidewall, and the front wall;

a first space collectively defined between the front wall, the first sidewall, the second sidewall, and the shell top;

wherein the truck shell device is connected to the truck proximate the truck bed;

wherein the front wall, the first sidewall, and the second sidewall are each at least partially formed of a drop-stitch material;

wherein the first space defines an open bottom for exposing the first space to the truck bed; and wherein at least one of the front wall, the first sidewall, the second sidewall, and the shell top is inflatable.

15. The truck shell device of claim 14, wherein the truck shell device is connected directly to the truck bed.

16. The truck shell device of claim 15, wherein the truck shell device is connected to the truck bed by clips and straps.

17. The truck shell device of claim 14, wherein the truck shell device is connected to the truck using a multi-component apparatus.

18. The truck shell device of claim 17, wherein the multi-component apparatus comprises clips and straps.

19. The truck shell device of claim 14, wherein the shell top is connected to at least one of the front wall, the first sidewall, and the second sidewall by tape.

20. The truck shell device of claim 19, wherein the tape is PVC tape.

21. The truck shell device of claim 14, wherein:

the first sidewall comprises a rear end of the first sidewall;

the second sidewall comprises a rear end of the second sidewall;

the rear end of the first sidewall and the rear end of the second sidewall collectively define an open rear;

the truck shell device further comprising a flap attached to the rear end of the first sidewall and the rear end of the second sidewall for covering the open rear; and wherein the flap is releasable from the open rear to provide access through the open rear.

22. The truck shell device of claim 21, wherein the releasable flap is configured to be rolled up.

* * * * *